US007691464B2

(12) United States Patent
Gerber et al.

(10) Patent No.: US 7,691,464 B2
(45) **Date of Patent: *Apr. 6, 2010**

(54) SURFACE

(75) Inventors: Ingo Gerber, Weil-im Schoenbuch (DE); Jan Tuma, Holzgerlingen (DE)

(73) Assignee: Gottlieb Binder GmbH & Co. KG, Holzgerlingen (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/504,428

(22) PCT Filed: Jan. 15, 2003

(86) PCT No.: PCT/EP03/00308

§ 371 (c)(1), (2), (4) Date: Aug. 13, 2004

(87) PCT Pub. No.: WO03/070392

PCT Pub. Date: Aug. 28, 2003

(65) Prior Publication Data

US 2005/0153096 A1 Jul. 14, 2005

(30) Foreign Application Priority Data

Feb. 21, 2002 (DE) ................................ 102 07 194

(51) Int. Cl.
*B32B 3/06* (2006.01)

(52) U.S. Cl. ......................... 428/99; 264/557; 425/363; 428/98; 428/141

(58) Field of Classification Search ................... 428/99, 428/223; 24/572.1; 425/85; 604/387; 623/23.71; 628/2.1
See application file for complete search history.

(56) References Cited

U.S. PATENT DOCUMENTS

| | | | | | |
|---|---|---|---|---|---|
| 5,180,620 | A * | 1/1993 | Mende | ........................ | 428/138 |
| 5,238,623 | A | 8/1993 | Mrozinski | | |
| 5,250,253 | A * | 10/1993 | Battrell | ........................ | 264/557 |
| 5,792,404 | A * | 8/1998 | Cree et al. | .................. | 264/134 |
| 6,162,040 | A * | 12/2000 | Clune | .......................... | 425/363 |
| 6,627,133 | B1 * | 9/2003 | Tuma | .......................... | 264/167 |
| 6,764,745 | B1 * | 7/2004 | Karasawa et al. | ........... | 428/141 |
| 6,766,817 | B2 | 7/2004 | da Silva | | |
| 6,946,170 | B2 | 9/2005 | Gerber et al. | | |
| 2001/0037876 | A1 | 11/2001 | Oost et al. | | |
| 2003/0038408 | A1 | 2/2003 | Schulte | | |

FOREIGN PATENT DOCUMENTS

| | | | |
|---|---|---|---|
| DE | 198 28 856 | | 10/1999 |
| DE | 101 06 705 | | 4/2002 |
| EP | 0 772 514 | | 12/1998 |
| EP | 0 933 388 | | 10/2002 |
| WO | WO 93/01047 | | 1/1993 |
| WO | WO-00/50232 | * | 8/2000 |

* cited by examiner

*Primary Examiner*—Brent T O'Hern
(74) *Attorney, Agent, or Firm*—Roylance, Abrams, Berdo & Goodman, L.L.P.

(57) ABSTRACT

A surface for an article has an artificially producible base structure (10). The structure (12) has or develops a capillary effect at which the quotient from capillary work (K) and adhesion work (A) is larger 1. The capillary structures and their capillaries have a negative capillary rise such that liquid is forced from the capillaries, allowing for a self-cleaning effect.

24 Claims, 2 Drawing Sheets

SURFACE

FIELD OF THE PRESENT INVENTION

The present invention relates to a surface for an article having a base structure produced artificially and exerting a self-cleaning effect.

BACKGROUND OF THE INVENTION

EP-B-0 772 514 discloses self-cleaning structures of articles having an artificial surface structure of elevations and depressions. The distance between the elevations ranges from 5 to 200μ, and the height of the elevations ranges from 50 to 100μ. In addition, at least the elevations are of water-repellent polymers or materials rendered permanently water-repellent. The elevations are not dissolvable by water or water containing detergents.

That solution exhibits a surface having elevations which repel contaminants. A lotus leaf structure is imitated which is known not to be contaminated as a result of self-cleaning, the biological structure of which repels even commercially available adhesives. Despite the remarkable results with respect to self-cleaning effect, the surfaces may be used only to a limited extent, in that either the range of materials to be used in manufacture is greatly restricted or the surface must undergo costly finishing for the purpose of waterproofing. In addition, the process of manufacturing of the disclosed surface is expensive and complicated. Coating processes or shaping processes with high-mesh screens are employed in the manufacture of the disclosed surface which are cost-intensive and difficult to control. Practical experience has shown that "Lotus effect" surfaces produced in this manner often do not yield the desired results as regards self-cleaning.

PCT/WO 93/01047 discloses a surface having a raised thermoplastic film. This surface has a multiplicity of macrocells in the form of elevations extending between these adjacent macrocells. The macrocells have a depth of 0.635μ to 3.81μ. The thermoplastic film has, in addition, at least a plurality of microindentations spaced at intervals ranging from 1.25μ to 6.35μ, that form a randomly distributed sand blast pattern on the film. These microindentations form as an additional structure a second type of elevations having an orientation opposite that of the elevations of the first type, so that the elevations are positioned separately as types on opposite sides of the surface. Such known surfaces, polyolefine foils, for example, such as ones made from polyethylene, with areas of elevations extending between them, are used in particular where special requirements are set for tactile or visual perception, and used for linings for clothing, hygiene or sanitation. Those surfaces possess no antisoiling properties, so that a self-cleaning effect cannot be demonstrated.

EP-A-0 933 388 discloses a structured surface possessing water repellent and/or oil repellent properties, along with low surface energy values. These disclosed surfaces have large water wetting angles. Only with difficulty are they wetted with water to possess a self-cleaning effect. To achieve this effect, a base structure produced by artificial means is provided with two different types of elevations as an additional structure on the surface. Smaller elevations are applied to a superstructure in the form of geometrically larger elevations, which, being immediately adjacent, come in contact with each other. To produce the known elevations and the superstructure as another type of elevations, the latter are simultaneously or in succession mechanically impressed into the surface material, etched in by lithographic processes, or applied by shaping processes or obtained by casting practices.

In the case of the mechanical impression process, the effect on the surface is appropriately exerted from the rear side, two types of structural elevations then are formed on its opposite side.

At least some damage to the surface material by the etching agent is to be expected when the structure is etched into this surface material. In the shaping application process, first the elevation structure involved is applied to the surface material by an application roller. This process is expensive and cost-intensive. There is no guarantee that the structure applied will not be separated from the base material again as a function of stress. In addition, the casting, imprinting, etching, and application processes disclosed are not suitable for making large quantities of structured surfaces available in large-scale industrial production. Although this known solution does yield very good results for self-cleaning, its counterpart in nature is in the form of the leaf surface of the nasturtium.

SUMMARY OF THE INVENTION

Objects of the present invention are to provide a surface characterized by a very high degree of removal of contaminants and permitting cost-effective large-scale industrial production.

These objects are attained by a surface possessing capillary action in which the quotient of capillary work K and work of adhesion A is greater than 1. The capillaries of the capillary structures exhibit so-called negative capillary rise, that is, liquid is forced from the capillaries. This action is true in particular for liquids where the angle of contact on the structured surface ranges from 90° to 180°. The respective effect of the capillaries on the surface is described by the capillary work K and work of adhesion A. Since the capillary work K draws the drop from the structure, while the work of adhesion A tries to retain the drop in the structure, choice of a value for the quotient of those two kinds of work greater than 1 makes it possible to subject a drop penetrating the capillary opening in wetting action to an opposing force making self-cleaning possible.

In one preferred embodiment of the surface of the present invention, the structure has or forms a capillary where the mean capillary radius $r_K$ is smaller than $r_T$, that is, the radius of the smallest drop of water occurring in the environment, a raindrop in particular.

Since drops of different sizes occur in use of the self-cleaning structured surface, it is additionally important in configuration of the structured self-cleaning surface that the capillary radii selected $r_K$ be smaller than the radius of the smallest raindrop $r_T$ occurring in nature. For this purpose, account is taken of the impact of free falling raindrops which may be dispersed into several small drops on striking any surface.

Consequently, the statement $r_K<r_T$ must apply to the capillary radius $r_K$ of the self-cleaning structure surface for a small drop not to fall into the structure without negative capillary rise to occur in the capillaries. Different capillary radii are then obtained for different fluids such as oil, water, chemical fluids, etc. because of the corresponding properties of the fluids. If the capillaries are produced by geometric structures other than tubules, such as pyramidal, conical, or truncated cone projecting lengths, a mean or average capillary radius $r_K$ is to be determined for these structures during their design.

In another preferred embodiment of the surface of the present invention, this surface is formed at least in part of hydrophilic materials, plastic materials in particular, such as thermoplastics and duroplastics especially in the form of polyvinyl chloride, polyterephthalate, polymethyl methacrylate, or polyamide. Unlike the disclosed solutions, a hydrophilic material is employed to increase the degree of antisoiling rather than hydrophobic or oleophobic surfaces. A higher degree of antisoiling surprising to the average expert in this field can be achieved with this hydrophilic material than with the known structures. Since the base structure for the surface is made of a hydrophilic plastic, the material is hygroscopic and absorbs moisture, so that a protective or separating layer possessing improved antisoiling properties is formed on the basis of the water molecule and accordingly the moisture in the material.

In another preferred embodiment of the surface of the present invention, the capillary is made up of a fastening element. The free end of the stalk component is connected to the base structure. On its other end, a fastening element such as a head or hook element is provided. The fastening element and at least a part of the stalk component have at least one capillary opening. In that configuration, fastening elements with interlocking heads and interlocking hooks, also designated as hook and loop fasteners in technical language, may be produced and may be obtained from the applicants' assignee, for example, under the registered trademark "Kletten®".

The hook and loop fastening material may be detachably connected from the hook side to the corresponding coating material to form a fastener or to the fastening heads of a correspondingly configured fastener element in which the loops of one fastening element detachably engage the heads of the other fastening element. A fastener characterized by a high degree of antisoiling is then obtained. This characteristic is advantageous, especially if such fasteners are used in the area of the clothing industry and automotive technology. If such fasteners are then used, for example, in the area of infant diapers, they repel soiling material, such as even material in the form of baby powder or baby lotion, so that the fasteners designed for the purpose permit reliable fastening of the infant diapers and subsequent disposal while folded.

Preferably, the capillaries as stalk components or as part of the fastening elements are positioned side by side on the surface in such a way that comparable capillaries are again formed by the interstices thereby formed.

The surface, especially if it is configured as an adhesive fastener element, may be produced continuously with its structures by a chill-roll process, also in conjunction with a calendering process. Chill-roll in technical language refers to "sudden cooling or chilling of the extruded plastic material by passage over highly efficient chilling rollers" (see Nentwig, "Kunstoff-Folien" [Plastic Foils], second revised edition, Hansa-Verlag, 2000, page 51). Firstly, this process permits stationary mounting of the capillary structure on the surface, since the latter is an integral part of the base support material in the form of the artificially produced base structure, such as one in the form of plastic foil. Secondly, very large quantities of structured band and foil material can be obtained by the manufacturing technology based on the chill-roll configuration of the process technology, since the texture roller operating in conjunction with a counterhold roller permits virtually continuous operation by means of extrusion into the recesses of the texture roller. A process conducted for this purpose in which dandy rollers are used as texture rollers is described, for example, in DE 198 28 856 C1.

In another embodiment of the surface of the present invention the capillary structure is obtained by a process of depositing drops of a plastic material. A process such as this is described in the subsequently published DE 101 06 705.4. In this process, at least one fastening element is formed in at least one partial area without shaping tools. The plastic material is applied in drops consecutively by at least one application device. The positions selected for deposition of the drops are three-dimensional with respect to the shape of the fastening element to be formed. The structure involved also permits configuration of fastening elements which preferably form the capillary opening in their longitudinal direction.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
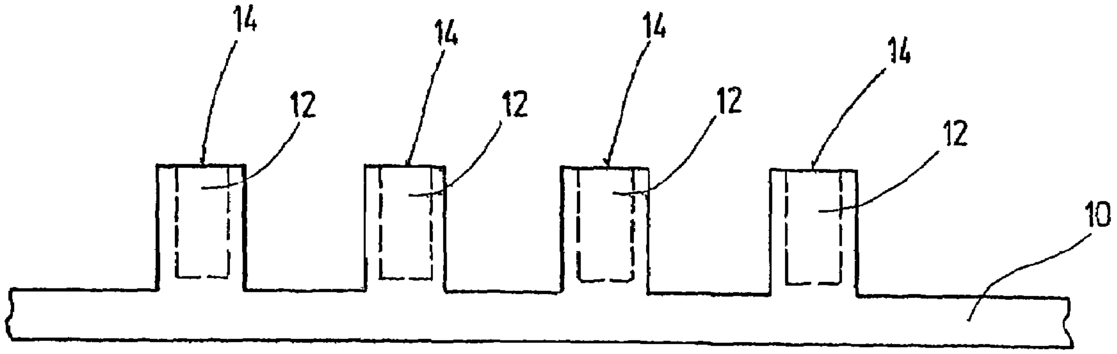
FIG. 1 is a diagrammatic side elevational view of a surface with capillary structures according to a first embodiment of the present invention.

The surface shown in FIG. 1 has in particular a base structure produced by artificial means, and has structures in the form of individual capillaries 12 mounted on it: These structures have a self-cleaning effect explained in detail in the following. These structures or capillaries 12 may be positioned tightly side by side in a plurality of arrangements on the base structure 10. Preferably, they are integrated with the base structure. The surface reproduced in FIG. 1 is shown greatly enlarged and both the base structure 10 and the other structures 12 may be minimal structures, even ones in the nanometer range.

Each capillary 12 has a capillary opening 14 with a capillary radius $r_K$ smaller than the radius $r_T$ of the smallest drop of water found in nature, a raindrop in particular.

The respective structured surface shown in FIG. 1 is designed to exert a self-cleaning action. The structuring is a configuration of individual capillaries 12. For the capillaries to exert the effect desired, a negative rise must be achieved in the capillaries, that is, liquid is forced from the capillaries. This effect applies to liquids where the contact angle on the structured surface ranges from 90° to 180°. The effect of the capillaries on the surface may be described in mathematical terms by the capillary work K and the work of adhesion A. The capillary work K draws the drop from the structure. The work of adhesion A retains the drop in the structure. The aim of the configuration of the structure is to render the quotient K/A>1 by appropriate choice of the capillary radius $r_K$. If $r_T$ is larger than $r_K$, the drop is distributed among a plurality of capillaries, so that the following applies:

$$\frac{r_T}{r_K} \cdot \frac{K}{A} > 1$$

The statement $K = \pi h_K^2 \cdot r_K^2 \cdot g \cdot \rho$ applies to the capillary work.

The following equation applies to the work of adhesion A, especially in the case of cylindrical capillaries:

$$A = (\sigma_{lg} + \sigma_{sg} - \sigma_{sl})\frac{8}{3}\pi \cdot \frac{r_T^3}{r_K}$$

in which

| | |
|---|---|
| σ is surface tension values, with | $r_K$ is the capillary radius, |
| $\sigma_{lg}$ for liquid-gas | $h_K$ is the rise of liquid in capillaries, |
| $\sigma_{sg}$ for solid-gas, | ρ is the density of the liquid, and |
| $\sigma_{sl}$ for solid-liquid, | g is the acceleration of gravity |
| $r_T$ is the radius of a drop | (9.81 $ms^{-2}$). |

The capillary-like other structures may, in contrast to the illustration in FIG. 1, also be embedded in the base structure or may be components of elevations concave and/or convex relative to the base structure 10.

Inasmuch as drops of different sizes occur in use of the self-cleaning structured surface, it is also of importance for configuration of this surface that the capillary radii $r_K$ be smaller than the radius of the smallest rain drop $r_T$ occurring in the environment. The impact of free falling rain drops is also taken into account for this purpose. This drop is on impact with any surface broken into a plurality of small drops, and accordingly also on impact on a self-cleaning structured surface exerting a capillary effect. The following statement applies to the radius $r_T$ of the smallest drop which occurs:

$$r_T = \frac{\sqrt{\frac{6\sigma_{lg}}{\rho g}}}{\frac{\rho v^2 \sqrt{\frac{6\sigma_{lg}}{\rho g}}}{6\sigma_{lg}} + 1}$$

in which:

$\sigma_{lg}$ is the surface tension of the liquid, g is the acceleration of gravity (9.81 $ms^{-2}$), ρ is the density of the liquid, and v is the rate of fall.

It follows that $r_K < r_T$ must be true of the capillary radius $r_K$ of the self-cleaning structured surface for a small drop not to fall into the structure, and thus, for no negative rise to take place in the capillaries. It is only that condition which makes self-cleaning possible. Different capillary radii are obtained for different liquids as a result of the corresponding properties of the liquids.

If the capillaries 12 are used as structures, it is necessary to observe the effect of the capillary forces on a liquid in both directions:

Case A: Liquid is drawn into a capillary (capillary rise $h_K$ positive).

Case B: Liquid is forced from the capillary (capillary rise $h_K$ negative), capillary depression.

If the drop lies on the structured surface, the drop is situated above the capillaries 12 and the case of interest is case B. The liquid is then forced upward from the capillary 12 into the rising drop against the force of gravity.

There is then obtained a capillary rise $h_K$ in a capillary 12.

Capillary rise $h_K$ in one capillary 12 thus results:

$$h_K = 2\frac{\sigma_{lg}\cos\theta}{\rho g r_K} = 2\frac{(\sigma_{sg} - \sigma_{sl})}{\rho g r_K}$$

since $\sigma_{lg} \cdot \cos\theta = \sigma_{lg} - \sigma_{sl}$ (Young's equation), in which:

σ is the surface tension values, where $\sigma_{lg}$ is for liquid-gas, $\sigma_{sg}$ is for solid-gas and $\sigma_{sl}$ is for solid-liquid, θ is the angle of contact of liquid and surface of solid, ρ is the density of the liquid, g is 9.81 $ms^{-2}$ (acceleration of gravity), and $r_K$ is the radius of the capillary 12.

The capillary rise $h_K$ in the capillary 12 has a negative value in case B. All quantities in the capillary rise formula are positive. Only the cosine of the angle of contact θ is negative provided that $$90° < \theta < 180°.$$

In principle the angles of contact must be greater than 90° for the desired effect to occur at all, that is, in order that the liquid be forced from the structures by capillary forces. As a result of roughness of surface, the statement is valid that $$\cos\theta = k\cos\theta,$$

in which:

θ is the angle of contact of rough surface,

θ is the angle of contact of smooth surface, and k is the roughness coefficient (>1).

In addition, the relationship of the radius of the structures to the forces of adhesion is essential in determination of the effect of capillary forces in structured surfaces, since in this situation forces of adhesion act against capillary forces on the wall of the capillary.

In the state of equilibrium, the capillary force acting on the liquid is as great in the opposite direction as the force of gravity of the column of liquid displaced. For purposes of calculation, a fictitious cylinder may be assumed in which the calculated rise of liquid corresponds (in this instance, for example) to $\Delta h_K = 10.157$ mm in the case of water with $\theta = 110°$, $\rho = 998.2\ kgm^{-3}$, and $r_K = 0.5$ mm).

Capillary work and work of adhesion are calculated rather than the forces for the sake of mathematical comparison.

The capillary work K then equals the product of volume, acceleration of gravity g, density ρ, and the capillary rise $h_K$, with $$K=\rho h_K^{2}\cdot r_K^{2} g\cdot\rho$$

Work of Adhesion in the Straight Circular Cylinder A

Work of adhesion A over the contact surface F:

$$A=(\sigma_{lg}+\sigma_{sg}-\sigma_{sl})\frac{8}{3}\pi\frac{r_T^3}{r_K}$$

The foregoing formula applies to a radius $r_T$ of the size distribution, in the lowermost area of the drop of water, of raindrops appearing in the environment with a plurality of capillaries used.

The capillary work must be greater than the work of adhesion for the drop not to come in contact with the bottom of the capillary, and for the drop to be evacuated from the recesses and rest on the surface. That condition which results in the advantageous self-cleaning. The quotient K/A is calculated for the purpose of comparison of the capillary work K and the work of adhesion A.

Especially good self-cleaning effects have been obtained when the surface is formed of hydrophilic materials, in particular plastic materials in the form of polyvinyl chloride, polyterephthalate, polymethyl methacrylate, or polyamide. The hydrophilic materials draw moisture into the base structure, and, in this way, form a protective layer against the occurrence of aqueous soiling elements. Use may also be made in the plastic materials of other cross-linked structures, especially ones in the form of acrylate material or materials which are found to be biodegradable.

Figure 2:
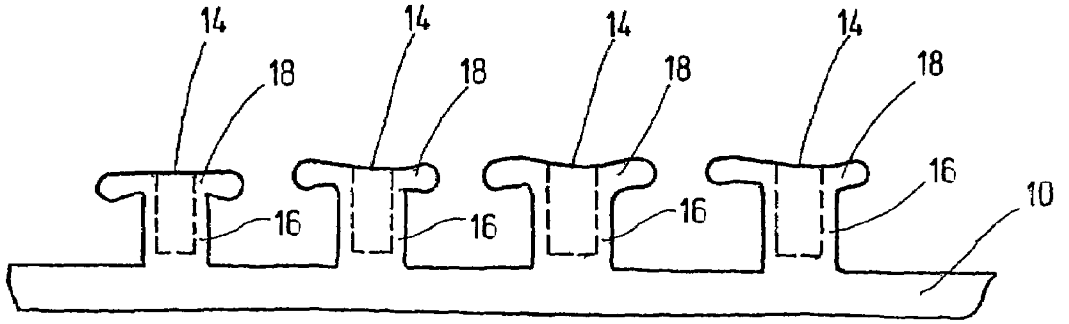
FIG. 2 is a diagrammatic side elevational view of a surface with capillaries configured as fastening elements, according to a second embodiment of the present invention.

If the plastic material illustrated in FIG. 1 has not yet reached its solidification temperature, the structure shown could be subjected to a calendering process in which, for example, a calendering roller (not shown) presses down on the free ends of the stalk elements 16. Shaping carried out for the purpose then results in a fastening element as shown in FIG. 2 having stalk elements 16. One end of the structure is connected to the base structure 10. Its other free end has a fastening element in the form of a head element 18. Between the ends of the stalks 16 in FIGS. 1 and 2 (i.e., between the end connected to the base structure 10 and end connected to head element 18 or its free end without a head element), the stalks have uniform cross-sectional configurations in shape and area, as illustrated. The outer edges of the individual head elements 18 can easily be forced downward in the direction of the base structure 10. In the cured state, they form a brace so that an interlock fastening is obtained, for example, for engagement of a pad element (not shown) or a corresponding fastener element with corresponding interlocking or head elements. The capillary opening 14, in turn, more or less on the longitudinal axis of the respective fastening element, enters both the concave center of the head element 18 and the stalk element 16. Consequently, a self-cleaning effect may also be achieved in the case of the adhesive fastening element. If, in contrast to the illustration in FIG. 2, the individual interlocking elements are moved closer together, there arises in the interstices a kind of capillary exerting the desired self-cleaning effect if it is made certain that the quotient of capillary work K and work of adhesion of A is greater than 1.

Figure 3:
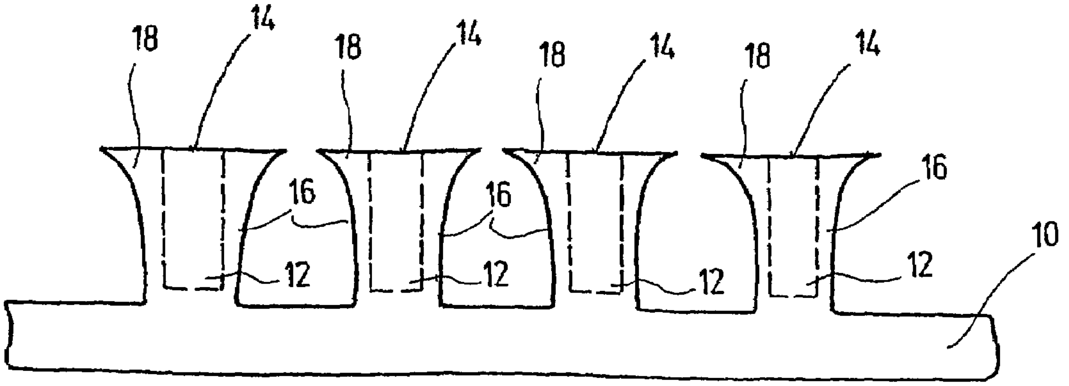
FIG. 3 is a diagrammatic side elevational view of a preform of a surface for subsequent production of a fastening element in the configuration shown in FIG. 2.

If the initial material as illustrated in FIG. 1 need not unfailingly be calendered, the fastening element shown in FIG. 2 may also be obtained by a process disclosed in DE 198 28 856 C1. Configuration of stalk elements 16 on the ends as desired requires in the process disclosed a shaping tool like a dandy roller. The very large number of openings of the sieve is obtained by etching, electroplating, or laser treatment. The sieve used for the purpose is mounted on a dandy or structural roller. A chill-roll process may be carried out by a pressure roller rotating in the direction opposite that of the structural roller. In this process, an extruded plastic material is conducted through the gap between the two rollers, and the fastening elements are produced in the openings of the sieve roller. To produce the capillary openings 14, the plastic material must be suitably displaced, for example, in the form of arbor elements introduced into the base of the sieve roller. This process may be applied to arrange fastening elements in a very high packing density and to design them to be very compact. This process is very favorable if it is desired to produce microfasteners in which the fastening elements are provided in the form of stalks 16 thickened on the end (as head elements 18) or lateral projections (hooks), with very high packing densities, for example, of 200 or more fastening elements per square centimeter. Base structures as shown in FIG. 3 may also be obtained, as a function of the dandy rollers used. It is possible to mold the free ends of the stalks by a calendering process so that a fastening material extending from the base structure is produced, as is shown in a side view in FIG. 2.

Another process for producing the surface in the configurations illustrated in FIGS. 1 to 3 may assume the form of construction with individual very small drops of plastic material deposited in succession in selected places. It is possible to achieve any size virtually as small as desired, along with high packing densities, without the need for correspondingly expensive design of shaping tools. In this way, the places at which the plastic droplets are deposited, as a result of relative movements of application device and a substrate on which the droplets are deposited, are easily determined preferably by computer control. It is possible to generate any stalk geometry, as well as head shapes on interlocking elements such as mushroom heads, star-shaped heads, and the like. In addition, shapes may be produced which can be produced only with great difficulty or not at all by conventional shaping tools such as dandy rollers. Shapes, such as loops, hooks or stays can be produced only poorly or not at all in view of the undercuts present by conventional shaping tools. The drop method may also be applied to generate the respective capillary opening 14 in the fastener or stalk material. The application device employed is represented by nozzle configurations capable of effecting application in the high-speed process. Only droplets made up of a small number of picoliters are applied to the sheet-like base structure material 10. Timing frequencies of several kilohertz may also be achieved in the application process. The build-up proceeds successively, the plastic material previously applied being immediately cured, for example, by means of ultraviolet radiation or the like. This drop application process is described in subsequently published DE 101 06 705.4.

A very advanced self-cleaning effect has been achieved with the structured surface of the present invention. A capillary effect is exerted and the structures used for the purpose may be obtained cost-effectively on an industrial scale and employed for a large number of applications. The base structure 10 with its other structures 12 may be configured as a foil material. The possibility also exists of immediately providing the surface of objects directly with the capillary structure, in particular by application of the drop depositing method described.

Figure 4:
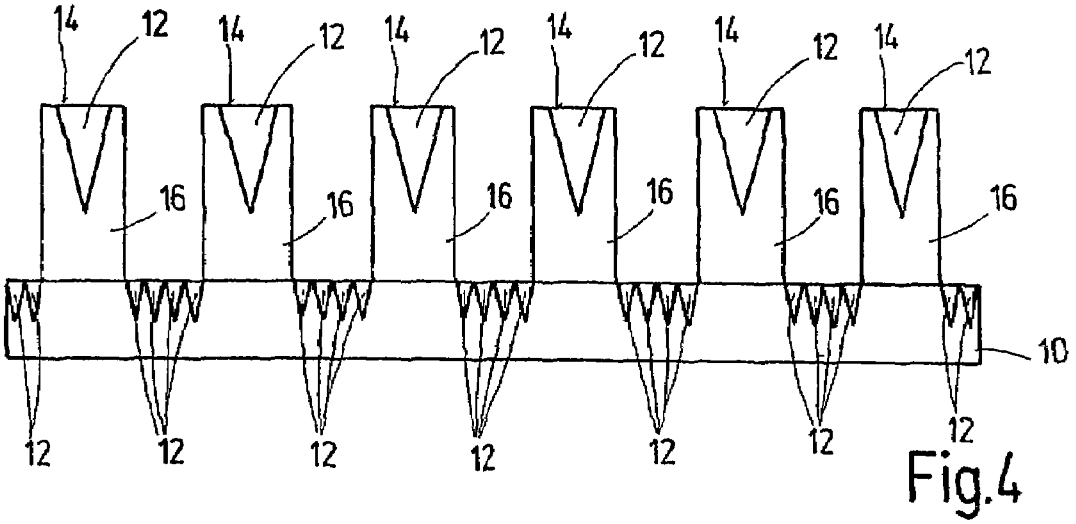
FIG. 4 is a diagrammatic side elevational view of a surface with capillary structures mounted on it in the form of tapering capillaries, according to a third embodiment of the present invention.

In the embodiment illustrated in FIG. 4, tapering capillaries 12 are built on the front end of the stalk elements 16. In addition, the tapering capillaries 12, the capillary opening 14 of which widen in the direction of the exterior, are present in the base structure 10. The capillary structures involved may be obtained by the chill-roll process referred to in the foregoing or by a cutting and notching process, as well as by means of laser or water torching. As an alternative or in addition to the tapering capillaries 12, use may be made of cylindrical capillaries 12, as indicated in another context as an example for the fastening elements illustrated in FIG. 5. If the capillaries 12 are designed to be tapering or truncated, a mean capillary radius may be determined for their calculation and then serve as the basis for formation of the quotient of capillary work K and work of adhesion A, which quotient must be greater than 1 if a self-cleaning effect is desired.

In another embodiment comparable to that of FIG. 4, but not shown, the stalk elements 16 may also be dispensed with, in which case the capillaries 12 are appropriately mounted only in the foil-like base structure 10. A structure used for this purpose, especially if it is transparent, is then suitable for application as a soiling-resistant cover of information signboards.

Figure 5:
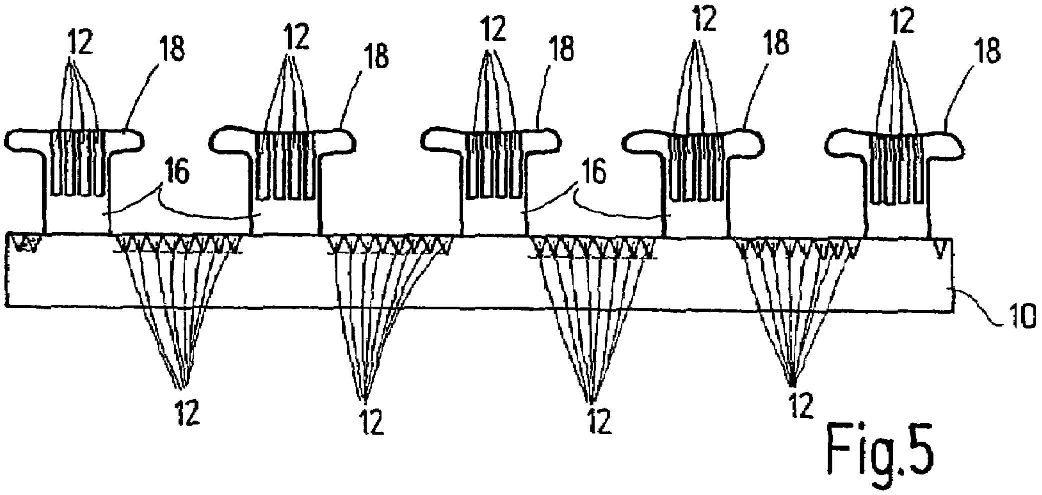
FIG. 5 is a diagrammatic side elevational view with a plurality of cylindrical and tapering capillaries having been introduced into the fastening elements or into the base structure, according to a fourth embodiment of the present invention.

In the embodiment shown in FIG. 5, a plurality of the capillaries 12 is introduced into the front of the respective fastening elements. Tapering capillaries 12 cover the top of the base structure 10.

Figure 6:
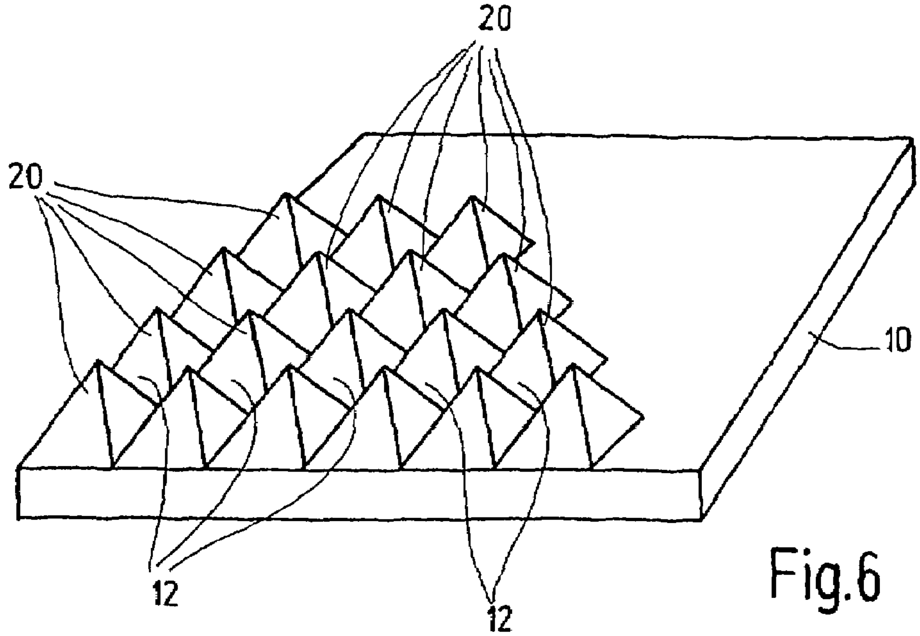
FIG. 6 is a perspective view of a surface with capillary structures mounted on it, such structures being made of roof-shaped or pyramidal projections above the base structure, according to a fifth embodiment of the present invention.

In the embodiment shown in FIG. 6, the structure 12 is made up of pyramidal, conical, or truncated-cone projecting lengths. The respective capillary then results from the interstices between the projecting lengths. In this instance as well, a mean capillary radius $r_K$ to be determined is to be adopted as the basis for design of the capillary effect in order to make certain that the quotient of capillary work K and work of adhesion A will be greater than 1. The embodiment shown in FIG. 6, especially if it is kept transparent, is also especially well suited for cleaning soiling matter from signboards subjected to environmental pollution. The sheet-like base structure 10 may be fastened to the signboards (not shown) by conventional adhesives.

The base structure 10 preferably has a thickness of 10μ to 50μ. The capillary depth preferably is greater than 5μ. All tubules or elongated cavities (pores) with very small interior diameters are suitable for use as capillaries (capillary tubes).

Cross-linkable plastics, cross-linkable polyacrylates in particular, are especially well suited as plastic materials for production of the respective capillaries 12, in addition to the base structure 10. If the base structure 10 is configured as a foil or path, the surface may also be employed as that of a shower curtain, tent panel, beach and patio umbrella, and as an article of clothing.

While various embodiments have been chosen to illustrate the invention, it will be understood by those skilled in the art that various changes and modifications can be made therein without departing from the scope of the invention as defined in the appended claims.

What is claimed is:

1. A surface for objects, comprising:
an artificially formed base structure; and
artificially formed fastening elements having stalks connected at first ends thereof to said base structure and head elements on opposite second ends of said stalks projecting laterally from said stalks, said stalks having uniform cross-sectional configurations in shape and area from said first end and to said second end, said fastening elements being positioned side-by-side forming capillaries at interstices formed therebetween, each said fastening element having a capillary extending through said head element thereof and at least partially into said stalk thereof, said capillaries having a capillary effect with a quotient of capillary work and work of adhesion greater than 1;
whereby said fastening elements exert a self-cleaning effect.

2. A surface according to claim 1 wherein
said base structure and said fastening elements are formed at least in part of hydrophilic material.

3. A surface according to claim 2 wherein
said hydrophilic material is one of thermoplasts and duroplasts.

4. A surface according to claim 2 wherein
said hydrophilic material is polyvinyl chloride, polyterephthalate, polymethyl methacrylate or polyamide.

5. A surface according to claim 1 wherein
said base structure has capillaries formed therein between said fastening elements and opening on an upper side thereof.

6. A surface according to claim 1 wherein
said base structure and other structures are produced by a chill-roll process.

7. A surface according to claim 1 wherein
said other structures are capillary structures formed by deposits of capillary structures formed by deposits of a plastic material drop-by-drop.

8. A surface for objects comprising:
an artificially formed base structure; and
artificially formed fastening elements having stalks connected at first ends thereof to said base structure and head elements on opposite second ends of said stalks projecting laterally from said stalks, said stalks having uniform cross-sectional configurations in shape and area from said first end and to said second end, said fastening elements having capillaries extending through said head elements and at least partially into said stalks, said capillaries having a capillary effect with a quotient of capillary work and work of adhesion greater than 1;
whereby said fastening elements exert a self-cleaning effect.

9. A surface according to claim 8 wherein
said base structure and said fastening elements are formed at least in part of hydrophilic material.

10. A surface according to claim 9 wherein
said hydrophilic material is one of thermoplasts and duroplasts.

11. A surface according to claim 9 wherein
said hydrophilic material is polyvinyl chloride, polyterephthalate, polymethyl methacrylate or polyamide.

12. A surface according to claim 8 wherein
said base structure has capillaries formed therein between said fastening elements and opening on an upper side thereof.

13. A surface according to claim 8 wherein
said base structure and other structures are produced by a chill-roll process.

14. A surface according to claim 8 wherein
said other structures are capillary structures formed by deposits of a plastic material drop-by-drop.

15. A surface for objects comprising:
an artificially formed base structure;
artificially formed elements having stalks connected at first ends thereof to said base structure and free ends on opposite second ends of said stalks, said stalks having uniform cross-sectional configurations in shape and area between said first ends and said second ends; and capillaries formed in said stalks and opening on said free ends thereof, said capillaries having a capillary effect with a quotient of capillary work and work of adhesion greater than 1;

whereby said capillaries exert a self-cleaning effect.

16. A surface according to claim 15 wherein said base structure and said fastening elements are formed at least in part of hydrophilic material.

17. A surface according to claim 16 wherein said hydrophilic material is one of thermoplasts and duroplasts.

18. A surface according to claim 16 wherein said hydrophilic material is polyvinyl chloride, polyterephthalate, polymethyl methacrylate or polyamide.

19. A surface according to claim 15 wherein said base structure and other structures are produced by a chill-roll process.

20. A surface according to claim 15 wherein said other structures are capillary structures formed by deposits of a plastic material drop-by-drop.

21. A surface according to claim 1 wherein each said head element has a concave surface remote from the respective stalk.

22. A surface according to claim 21 wherein each said head element has an outer edge portion surrounding said concave surface movable toward said base structure.

23. A surface according to claim 8 wherein each said head element has a concave surface remote from the respective stalk.

24. A surface according to claim 23 wherein each said head element has an outer edge portion surrounding said concave surface movable toward said base structure.

* * * * *